United States Patent
Van Den Berg

(10) Patent No.: US 8,543,276 B2
(45) Date of Patent: Sep. 24, 2013

(54) UNMANNED AUTONOMOUS VEHICLE FOR DISPLACING FEED

(75) Inventor: Karel Van Den Berg, Bleskensgraaf (NL)

(73) Assignee: Lely Patent N.V., Maassluis (NL)

( * ) Notice: Subject to any disclaimer, the term of this patent is extended or adjusted under 35 U.S.C. 154(b) by 375 days.

(21) Appl. No.: 12/789,473

(22) Filed: May 28, 2010

(65) Prior Publication Data

US 2010/0230183 A1   Sep. 16, 2010

Related U.S. Application Data

(63) Continuation of application No. PCT/NL2008/000248, filed on Nov. 10, 2008, and a continuation-in-part of application No. 12/297,686, filed on Oct. 20, 2008, which is a continuation of application No. PCT/NL2007/000083, filed on Mar. 23, 2007.

(30) Foreign Application Priority Data

Apr. 18, 2006 (NL) .................................... 1031605
Nov. 29, 2007 (NL) .................................... 1034771

(51) Int. Cl.
*G06F 17/00* (2006.01)
*G06F 19/00* (2011.01)
*B60G 17/016* (2006.01)
*H02P 5/46* (2006.01)

(52) U.S. Cl.
USPC ..... 701/23; 701/38; 701/70; 318/5; 180/6.48; 340/440

(58) Field of Classification Search
USPC ................ 701/26, 36, 41, 69–71, 200, 205, 701/300, 1, 22, 23, 38, 82; 318/3, 5, 580; 180/6.2, 167, 6.48; 340/438, 441
See application file for complete search history.

(56) References Cited

U.S. PATENT DOCUMENTS 2,966,256 A   12/1960   McLeland
3,273,038 A   9/1966   Miller
4,119,900 A   10/1978   Kremnitz
4,515,221 A   5/1985   van der Lely
4,603,753 A   8/1986   Yoshimura et al.
(Continued)

FOREIGN PATENT DOCUMENTS

| AT | 6016UU A | 3/2003 |
|---|---|---|
| DE | 1109441 A | 6/1961 |
| DE | 1183301 A | 12/1964 |
| DE | 4425924 A | 1/1996 |
| DE | 4444508 C1 | 2/1996 |
| DE | 29800152 U1 | 5/1998 |
| EP | 0142594 B1 | 6/1989 |
| EP | 0402764 A2 | 12/1990 |
| EP | 0382693 B1 | 10/1994 |
| EP | 0943235 A2 | 9/1999 |
| EP | 1369017 A1 | 10/2003 |
| EP | 1369010 A1 | 12/2003 |
| EP | 1369012 A1 | 12/2003 |
| EP | 1584230 A | 10/2005 |
| EP | 1779722 A1 | 5/2007 |
| FR | 2862489 A1 | 5/2005 |
| GB | 2313190 A | 11/1997 |
| GB | 2313191 A | 11/1997 |
| NL | 7416427 A | 6/1975 |
| WO | 9603259 A1 | 2/1996 |
| WO | 0070935 A | 11/2000 |
| WO | 0070936 A | 11/2000 |
| WO | 2006035627 A1 | 4/2006 |

*Primary Examiner* — Thomas Tarcza
*Assistant Examiner* — Edward Pipala
(74) *Attorney, Agent, or Firm* — Hoyng Monegier LLP; Coraline J. Haitjema; David P. Owen

(57) ABSTRACT

An unmanned autonomous vehicle for substantially lateral displacement of feed lying on a ground, comprising two wheels separately drivable by separate drive units, a torque difference adjusting device for adjusting the torque difference between the wheels, a control unit for controlling the vehicle and moving it in a direction of travel by controlling at least one of the separate drive units, a feed displacing device for substantially lateral displacement of the feed, and an adjusting device which is arranged to adjust the height and/or the position of a lowest point of the feed displacing device. The adjusting device comprises a vehicle tilting device which is arranged in such a manner that the lowest point will be located at least substantially off the center line of the vehicle.

20 Claims, 2 Drawing Sheets

(56) References Cited

U.S. PATENT DOCUMENTS

| | | |
|---|---|---|
| 4,674,048 A | 6/1987 | Okumura |
| 4,700,302 A | 10/1987 | Arakawa et al. |
| 4,852,677 A | 8/1989 | Okazaki |
| 4,862,047 A | 8/1989 | Suzuki et al. |
| 5,032,775 A | 7/1991 | Mizuno et al. |
| 5,109,566 A | 5/1992 | Kobayashi |
| 5,309,592 A | 5/1994 | Hiratsuka |
| 5,341,540 A | 8/1994 | Soupert |
| 5,646,494 A | 7/1997 | Han |
| 5,951,782 A | 9/1999 | Truitt |
| 6,038,501 A | 3/2000 | Kawakami |
| 2002/0130207 A1 | 9/2002 | Van Den Berg |
| 2003/0020243 A1 | 1/2003 | Van Den Berg |
| 2006/0180089 A1 | 8/2006 | Van Den Berg |
| 2007/0227455 A1 | 10/2007 | Sumiya |

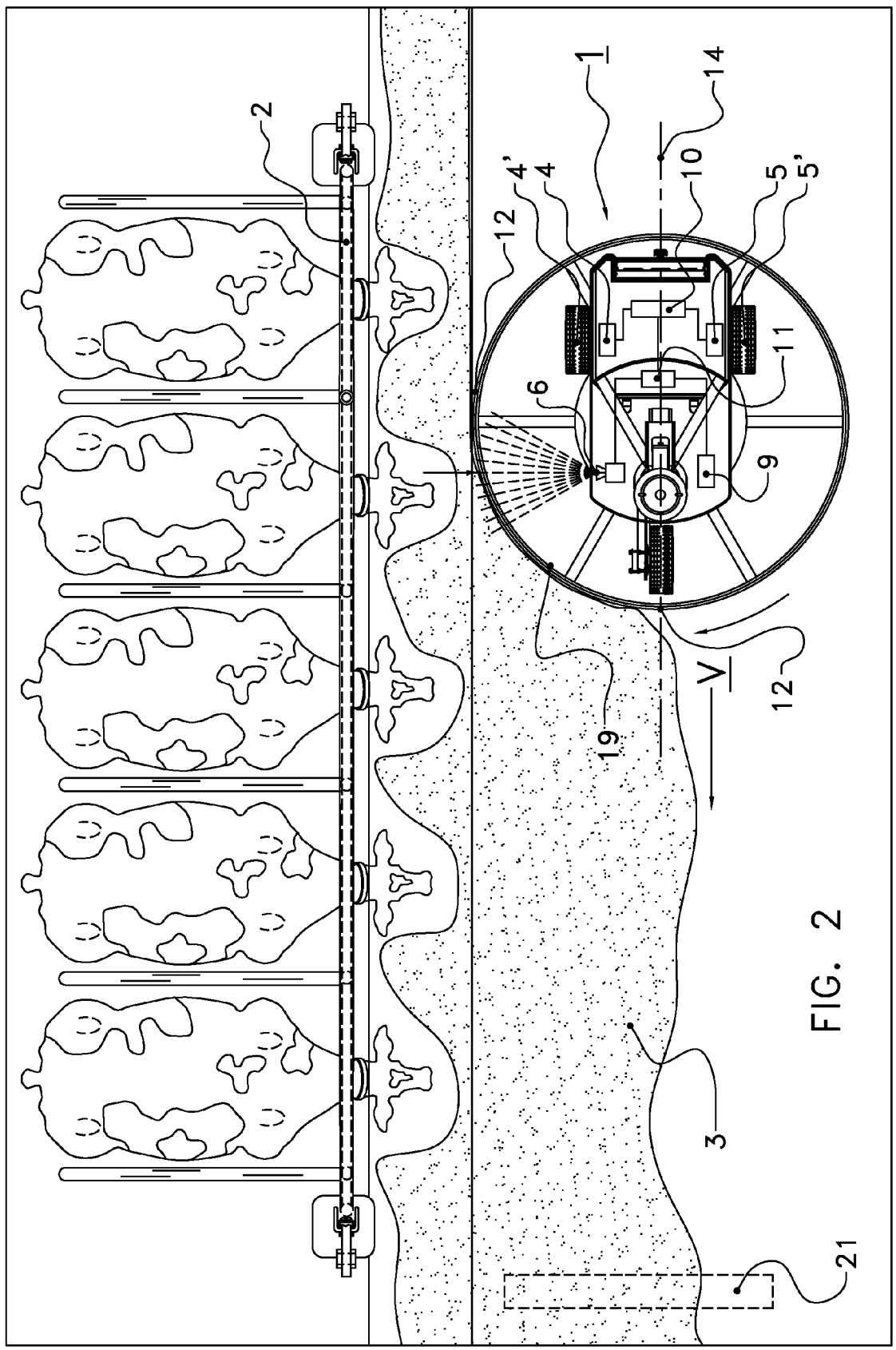

UNMANNED AUTONOMOUS VEHICLE FOR DISPLACING FEED

This application is a continuation of international application no. PCT/NL2008/000248 filed on Nov. 10, 2008, which claims priority from Netherlands application no. 1034771 filed on Nov. 29, 2007, and this application is also a continuation-in-part of U.S. application Ser. No. 12/297,686 filed on Oct. 20, 2008, which is a continuation of international application no. PCT/NL2007/000083 filed on Mar. 23, 2007, which claims priority from Netherlands application no. 1031605 filed on Apr. 18, 2006. The contents of all of the foregoing applications are hereby incorporated by reference in their entirety.

BACKGROUND OF THE INVENTION

1. Field of the Invention

The invention relates to an unmanned autonomous vehicle, and in particular to an unmanned autonomous vehicle comprising two wheels for substantially lateral displacement of feed lying on the ground.

2. Description of the Related Art

An unmanned autonomous vehicles for displacement of feed lying on the ground are known. A drawback of the known vehicles of this type is that control of the vehicle is not very flexible. In particular, this control, at least the functioning of the vehicle, is passive, there being few possibilities to adapt the functioning to other conditions of use or users' wishes.

SUMMARY OF THE INVENTION

It is an object of the invention to provide an unmanned vehicle of the mentioned type which enables a more manageable or at least more flexible functioning.

According to the present invention, this object is achieved by means of an unmanned autonomous vehicle which comprises an adjusting device arranged to adjust the height and/or the position of a lowest point of a feed displacing device. This may comprise a vehicle tilting device which is arranged in such a manner that the lowest point will be located at least substantially outside the center line of the vehicle. By making the lowest point of the feed displacing device adjustable to be positioned not on the center line of the vehicle, the vehicle will be more flexibly controllable. In a vehicle with a rotatable feed displacing device whose lowest point, if defined, lies at the front on the center line of the vehicle, the feed displacing device provided for this vehicle will in principle be able to rotate in two directions, if the direction of rotation was not already set by an earlier encounter with feed or the like. The direction of rotation depends on the exact point on the feed displacing device where the resistance against the feed is encountered. However, by means of the vehicle according to the present invention, it is possible to adjust the feed displacing device, in particular the lowest point thereof, in such a manner that the first encounter with the feed, for example being encountered at slowly increasing feed height, will take place with greater certainty on the desired side of the center line of the vehicle.

On the other hand, if for example the location of the feed does not cause problems in relation to the possible direction of rotation of the (one or more) feed displacing device, it may still be advantageous to displace a possible lowest point to the left or to the right. The result thereof is namely that, upon displacing feed by the feed displacing device, the feed can be lifted to some extent, so that it will remain, for example, sufficiently airy, or will at least allow a more even displacement. In particular if the location of the lowest point is adjustable during operation, because the adjusting device is arranged for this purpose, it will be possible to obtain such advantages. However, in general, it will be obvious that the functionality of the vehicle will be enhanced by the adjusting device and by the adjustability of the lowest point.

Moreover, it is pointed out that where previous vehicles comprise an angle adjustment, the lowest point continues to be located in principle at the same height and on the center line, so that there is little flexibility.

Favorable embodiments of the present invention are described in the dependent claims, as well as hereinafter. In particular, the adjusting device comprises a height adjustment. By means of the height adjustment it is, for example, possible to adjust a height of the lowest point of the feed displacing device. The ground clearance, for example, is adjusted in this manner, which may be practical in the case of an uneven ground, ridges and the like. It is also possible thus to achieve an adjustment of the feed displacing device, in particular of the lowest point thereof, which depends on the sort of feed. For, a fine powder feed may require a lower lowest point than a coarser feed.

Moreover, a height adjustment makes it possible to "lift" the feed displacing device, so that it will for example be possible for the vehicle to move to another site, in which case the feed displacing device will remain free from the ground between two working sites. This may, for example, result in a cleaner ground. Inversely, a displacement of the lowest point to the other side may cause both a compression of the feed and a very reliable displacement thereof.

In embodiments, the vehicle further comprises an additional supporting point, such as a sliding shoe or a third wheel. Owing to this, the vehicle need, for example, no longer (also) be supported on the lowest point of the feed displacing device. Owing to some ground clearance, wear, for example, can be limited. This will also result in an improved controllability.

In embodiments, the adjusting device is arranged to adjust the height of at least one of a wheel and the additional supporting point. This makes it possible both to displace the lowest point of the feed displacing device to the left or to the right, and to adjust the height of the lowest point. For three effective supporting points a single adjustability is sufficient but, of course, such a height adjustability could also be provided for a plurality of wheels and/or supporting points.

In favorable embodiments, the adjusting device is arranged for an automatic height adjustment, in particular such an automatic height adjustment that the feed displacing device will exert a substantially constant pressure on a ground. This controls possible wear of the feed displacing device. On the other hand, if the pressure is zero, because there is for example some distance to the ground, the adjusting device may also be arranged to guarantee a constant ground clearance. For this purpose, the adjusting device may comprise a suitable sensor device, such as a pressure sensor, a resistance sensor or a feeler or a distance sensor, which measures the distance from the lowest point to the ground, such as, for example, a time of flight scanner, a laser scanner, etc.

As a sensor device there may also be provided a sensor which recognizes the kind or condition of the ground, such as feed or sort of feed, or sand, a grid, etc. By means of a signal from such a sensor it is possible for the control unit to set automatically the adjustment of the feed displacing device. Therefore, the vehicle advantageously comprises a sensor which recognizes the kind or condition of the ground, the control device being arranged to adjust, by means of a signal from the sensor, the height and/or the position of the feed displacing device, in particular of a lowest point thereof The sensor may, for example, comprise a camera with image recognition, a conductivity meter such as in a metal detector, etc. Alternatively, an ultrasonic distance meter may also be applied.

In embodiments, the vehicle comprises a distance determining device for determining the distance from the vehicle to a wall portion, the control unit being programmed in such a manner that, during operation, the vehicle will be kept at a distance determined by the distance determining device to the wall portion, which distance is greater than or equal to a pre-adjusted minimum distance to the wall portion. This ensures that the vehicle will be able to follow a "neat" route along the wall portion, and will, in principle, be able to position the feed evenly and at equal distances. An ultrasonic sensor may, for example, serve as a distance meter.

In an embodiment of an unmanned vehicle according to the invention, the torque difference adjusting device is provided with a torque difference determining device for determining the torque difference between the wheels. In this case, it is in particular preferred if the control unit is programmed in such a manner that, during operation, the drivable wheels of the vehicle will show a torque difference determined by the torque difference determining means, which difference is smaller than or equal to a pre-adjusted maximum torque. Controlling the unmanned vehicle on the basis of the torque difference ensures that the unmanned vehicle will in each case substantially laterally displace an at least substantially equal amount of feed, because the torque difference is precisely caused by and is proportional to the force required for displacing an amount of feed.

A particularly accurate lateral displacement of feed may be achieved if the unmanned vehicle is provided with an orientation determining device to determine the orientation of the center line of the vehicle relative to the wall portion, the control unit being programmed in such a manner that, during operation, the center line of the vehicle will remain in an orientation determined by the orientation determining device relative to the wall portion, which orientation is at least substantially equal to a pre-adjusted orientation.

In embodiments, the unmanned vehicle further comprises a touch protection which extends around the outer side of the vehicle and which is arranged to supply to the control unit a signal which depends on an encountered resistance or force or pressure. By means of such a protection, the vehicle is safer for the environment, in particular for persons. The protection may in particular comprise a ring having a conductive portion, the resistance of which portion changes by the exertion of a force or pressure, for example owing to the fact that two conductive portions come closer to each other. By measuring the resistance change, it is possible to determine a signal. It is thus possible for the control unit to perform a certain action in dependence on the generated signal, for example the size thereof.

In particular, the control unit is arranged to change the orientation when the signal exceeds a particular threshold, in particular to inverse the orientation. Exceeding a threshold means that the mechanical resistance of the vehicle has become too high, which indicates the presence of a non-displaceable obstacle, such as a cow or a human being. In this case, inversion of the orientation/direction of travel reduces the danger.

In embodiments, the vehicle further comprises a sensor which is arranged to supply a signal to the control unit upon recognizing a detecting device located on or in the ground. By means of the signal it is possible to additionally control the vehicle, for example along a preferred route, or to indicate boundaries of an area to be worked or a safety area, for example an area in which human beings may be present and to which, consequently, the vehicle should not have access.

In particular, the sensor comprises an inductive or optical sensor, and the detecting device comprises a conductive or magnetic detecting means or an optical detecting means such as a colored surface. By means of such sensors and devices, delimitation of a route or area, and changes thereof, can take place in a very effective manner. It is also possible to combine this sensor with the sensor device which recognizes the kind or condition of the ground and which has already been mentioned in the foregoing. It is thus possible for an optical camera to recognize not only a boundary or route, but also a sort of feed or type of ground.

In an embodiment of an unmanned vehicle according to the present invention, the control unit is programmed in such a manner that, for the control of the vehicle, priority is given to the distance determined by the distance determining device in combination with the pre-adjusted minimum distance. This prevents the unmanned vehicle from coming too close to the wall portion in the case of little feed lying on the ground. In particular in the case when the wall portion is a feed fence where animals, such as for example cows, are present, a too close approach to the animals might lead to an undesirably great unrest with the animals. Moreover, a too small distance to the wall portion might lead to an undesired accumulation of the feed.

In a preferred embodiment of an unmanned vehicle according to the invention, the pre-adjustable distance is adjustable during operation, thus in particular the distance from the vehicle to a wall portion. The adjustment may, for example, depend on the moment of the day, the period which has elapsed since the unmanned vehicle was present at the same position, the sort of animals or the individual animals which are present at the wall portion, for example a feed fence. In a preferred embodiment of an unmanned vehicle according to the present invention, the pre-adjusted maximum torque difference and/or the pre-adjusted orientation are/is also adjustable during operation.

The feed displacing device preferably comprises a freely rotatable annular, in particular circular, element whose outer circumference forms the outer circumference of the vehicle. In this case, no separate drive mechanism for the feed displacing device is needed, because the freely rotatable annular, in particular circular, element is driven by the feed itself (substantially by frictional engagement). If desired, the outer surface of the annular, in particular circular, element may be provided with one or more friction increasing layers and/or elements. In order to achieve a reliable, substantially lateral displacement of the feed, an embodiment of an The unmanned vehicle according to the invention is characterized in that the annular, in particular circular, element is tilted in such a manner that it is located closest to the ground at least substantially in the direction of travel of the vehicle. If the angle enclosed by the annular or circular element and the ground is adjustable, it is possible to adjust the unmanned vehicle in such a manner that different sorts of feed are correctly displaced at least substantially transversely to the direction of travel of the vehicle.

The distance determining device preferably comprises an ultrasonic sensor. It is further advantageous if the unmanned vehicle is provided with a means for detecting skid of at least one of the drivable wheels.

If the unmanned vehicle is provided with an open bottom, material, such as feed, is prevented from accumulating in the interior of the vehicle and possibly adversely affecting there the operation of the unmanned vehicle.

According to an embodiment of an unmanned vehicle according to the invention, feed can be supplied if the unmanned vehicle is provided with a storage container for containing feed, and a discharge device for discharging feed towards the ground. The storage container is preferably provided with a mixer for mixing feed. In this case, it is advantageous if the control unit controls the operation of the discharge device on the basis of data from the distance determining device and/or the torque difference determining device and/or the speed of the vehicle and/or the weight decrease of the storage container. Alternatively or additionally, the unmanned vehicle may be provided with a signaling device for supplying a signal (for example for drawing the attention of an owner and/or operator of the unmanned vehicle), the control unit controlling the operation of the signaling device on the basis of data from the distance determining device and/or the torque difference determining device.

BRIEF DESCRIPTION OF THE DRAWINGS

The invention will be explained with reference to a number of exemplary embodiments shown in the accompanying figures, in which:

FIG. 2 is a diagrammatic top view of the unmanned vehicle according to the invention for use in the case of displacing feed towards a feed fence.

DESCRIPTION OF ILLUSTRATIVE EMBODIMENTS

Figure 1:
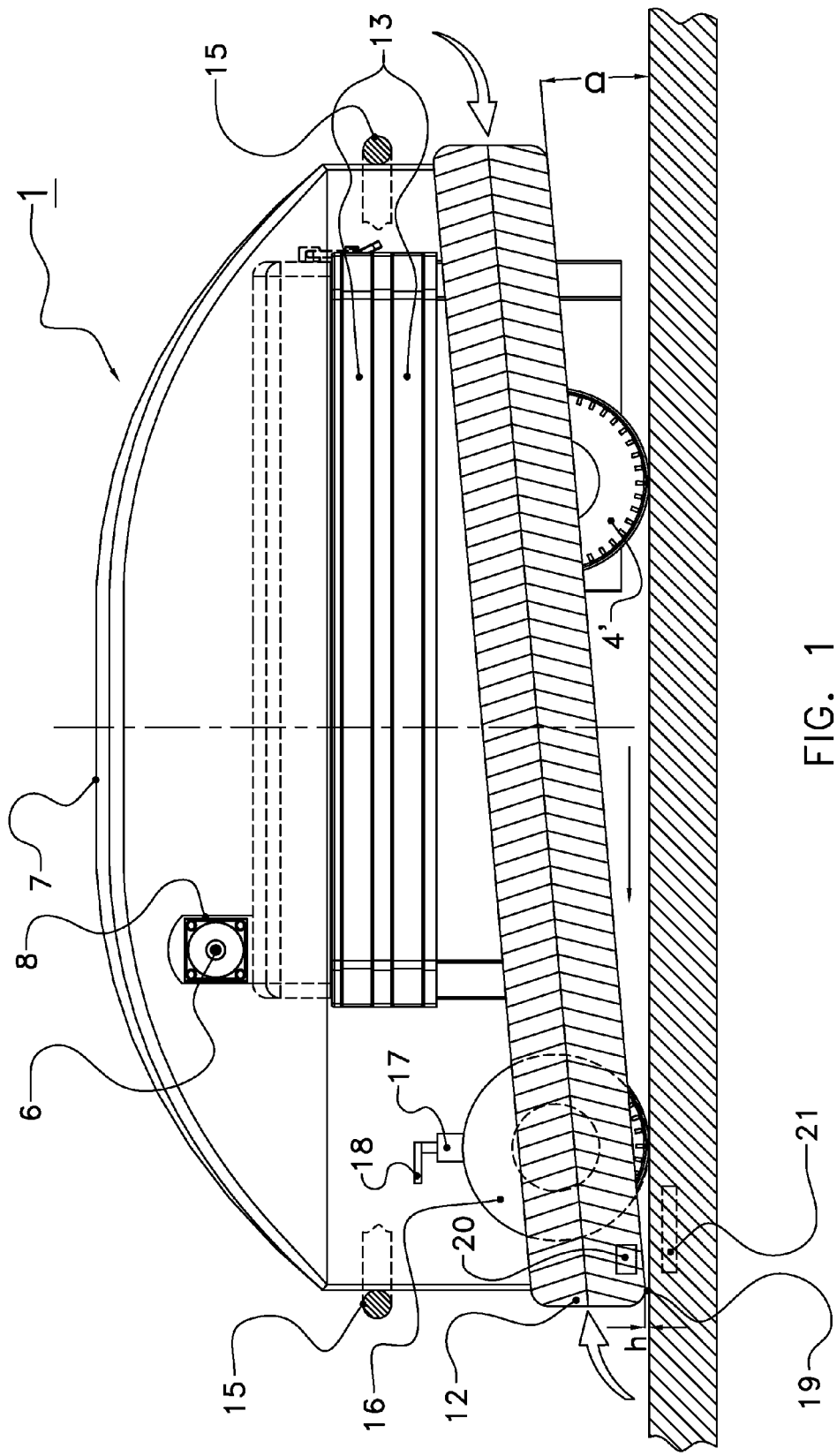
FIG. 1 is a diagrammatic side view of the unmanned vehicle according to the invention.

The following is a description of certain embodiments of the invention, given by way of example only and with reference to the drawings. FIGS. 1 and 2 show an unmanned autonomous vehicle 1 for substantially lateral displacement of feed 3 lying on the ground towards a feed fence 2. The feed 3, which may be solid, liquid or a mixture thereof, has been deposited at the feed fence 2 in a manner known per se, for example by means of a tractor. It will be obvious that the present invention is also applicable in other devices for supplying feed to animals, so that the feed fence shown in FIG. 2 is only one of the many examples of a wall portion in the vicinity of which feed can be deposited. In the present invention, by the term "wall portion" all forms of separating elements are meant, whether or not having an open structure, it being possible for the wall portion to assume many different, curved, rectilinear, angular, etc. shapes.

Autonomously displaceable vehicles, for performing numerous different functions, as well as the control of such vehicles, are known per se, and will consequently not be described here in detail. Automatic charging of the energy supply of the vehicle and automatic loading and unloading of other materials into and from, respectively, containers present on the vehicle are known as well. Reference is made to the following patent documents: U.S. Pat. No. 2,966,256, DE1109441, DE1183301, EP0382693, DE4425924, U.S. Pat. No. 5,309,592, EP0142594, DE4444508, GB2313190, U.S. Pat. No. 5,109,566, GB2313191, U.S. Pat. No. 3,273,038, NL7416427, U.S. Pat. Nos. 5,341,540, 5,646,494, EP0943235, EP1369010, EP1369012 and EP1369017.

The unmanned vehicle 1 comprises two wheels 4', 5' which are drivable by separate drive units 4, 5. The unmanned vehicle 1 is further provided with a distance determining device 6, in the embodiment shown an ultrasonic sensor, for determining the distance from the vehicle 1 to the feed fence 2. It will be obvious that other suitable sensors known in the art, such as for example the sensors mentioned in the patent documents listed above, may be used for determining the distance. The unmanned vehicle 1 may be provided with an external, protective covering 7, which is provided with apertures 8, so that the ultrasonic sensor 6 is enabled to detect the feed fence 2. In order to prevent material, such as feed and the like, from accumulating in the interior of the unmanned vehicle 1 via the apertures 8, the bottom of the unmanned vehicle 1 may be at least partially open. This also makes it possible to provide within the vehicle a pick-up device for picking up material, for example dirt.

The unmanned vehicle 1 further comprises an orientation determining device 9, in the example shown a gyroscope, for determining the orientation of the center line 14 of the vehicle 1 relative to the feed fence 2. It will be obvious that other sensors known in the art, such as for example the sensors mentioned in the patent documents listed above, may be used for orientation determination, such as an electronic compass or a camera with image recognition equipment.

The unmanned vehicle 1 is also provided with a torque difference determining device 10 for determining the torque difference between the wheels 4', 5'. Such a torque difference determining device, which uses data from the drive means 4, 5, is known per se. Such a torque difference determining device may also be used for detecting skidding of one of the wheels, and after detecting this it is possible to perform a corrective action (reduction of the number of revolutions, alarming an operator).

The unmanned vehicle 1 is further provided with a control unit 11 for controlling the unmanned vehicle 1 and moving it in a direction of travel. The control unit 11 is connected, via electric wires or, if desired, in a wireless manner, to the distance determining device 6, the orientation determining device 9, the torque difference determining device 10, and the drive mechanisms 4, 5 of the wheels 4', 5' for exchanging data.

For displacing feed 3 substantially transversely to the direction of travel V of the unmanned vehicle, the unmanned vehicle 1 is provided with a feed displacing device 12. Such a feed displacing device may comprise, for example, by an obliquely disposed slide, or by a conveyor belt. However, according to an embodiment of the invention, the feed displacing device 12 preferably comprises a freely rotatable circular element 12, whose outer circumference forms the outer circumference of the unmanned vehicle 1. When, during the operation of the unmanned vehicle 1, the annular, in particular circular, element 12, which may for example be a ring or a disc, comes into contact with the feed, the element 12 is automatically rotated. In other words the annular or circular element 12 is feed driven. An extremely reproducible displacement of the feed is achieved if the annular or circular element 12 is tilted at an angle α in such a manner that it is located closest to the ground, at least substantially in the direction of travel V of the vehicle 1. Depending on the feed to be displaced, the angle α between the annular or circular element 12 and the ground may be adjustable. If desired, during operation of the vehicle 1, the angle α is adjustable by a tilting means known per se, such as a cylinder, which are controlled by the control unit 11.

A protective device, in the form of a circumferential ring, is denoted by 15 in FIG. 1. The ring comprises for example conductive material, such that the electrical resistance will change when pressure is exerted on the ring 15. This resistance change may, for example, be used by the control unit 11 to carry out a corresponding action, such as reversal of the vehicle orientation V. The height of the ring may be selected in dependence on obstacles to be expected, in which case an expected maximum height of the feed 3 may also be taken into account. Incidentally, also the sensitivity of the ring 15 may be selected in such a manner that the maximum mechanical resistance to be exerted by the feed 3 against the vehicle is insufficient to activate the ring and cause the vehicle to turn.

Moreover, the vehicle shown in the drawings comprises an additional wheel 16 and an adjusting device, comprising a wheel suspension 17 with a height adjuster 18. The additional wheel may serve to reduce the load, and consequently the wear, of the element 12, and may alternatively also comprise for example a sliding shoe or the like. The wheel suspension 17 and the height adjuster 18 may serve to adapt the clearance height h of the lowest point 19 of the element 12 to, for example, the type of feed or the surface condition of the ground.

Alternatively or additionally, such a height adjuster may also be fitted on at least one of the wheels 4', or on all the wheels. As a result, the lowest point 19 may, for example, be moved from the center line. In FIG. 2, the lowest point 19 is displaced to the right, for example by lifting the left wheel, or by lowering the right wheel.

Upon depositing the feed on the ground, and during eating of the feed by animals present at the feed fence, the feed is accumulated to different heights over different distances to the feed fence. In order that the animals will always be able to get at a desired amount of feed in a simple manner, it is ensured that feed is displaced to the feed fence by having the unmanned vehicle regularly move along the feed fence 2, as diagrammatically shown in FIG. 2. In order that the unmanned vehicle 1 is correctly controlled, the control unit 11 is programmed in such a manner that, during operation, the vehicle 1 will be kept at a distance to the feed fence 2. This distance is determined by the distance determining device 6 and is greater than or equal to a pre-adjusted minimum distance to the feed fence. The control unit 11 is programmed so that, during operation, the center line 14 of the vehicle remains in an orientation determined by the orientation determining device 9 relative to the feed fence 2, which orientation is at least substantially equal to a pre-adjusted orientation. The control unit 11 is also programmed so that, during operation, the drivable wheels 4', 5' of the unmanned vehicle 1 will have a torque difference determined by the torque difference determining device 10, torque difference being smaller than or equal to a pre-adjusted maximum torque. This means that the unmanned vehicle 1 will always maintain a correct orientation relative to the feed fence 2, that the unmanned vehicle 1 will not come within the minimum distance to the feed fence 2, and that it is ensured that the feed will not be accumulated too much by the vehicle, because, in the case of the unmanned vehicle 1 moving through a too large amount of feed, the torque difference would become too great.

The control unit 11 is programmed in such a manner that, for controlling the unmanned vehicle 1, priority is given to the distance determined by the distance determining device 6 in combination with the pre-adjusted minimum distance.

In a preferred embodiment of an unmanned vehicle 1, the pre-adjustable distance is adjustable during operation. The adjustment may, for example, depend on the moment of the day, the period which has elapsed since the unmanned vehicle was present at the same position, the sort of animals or the individual animals which are present at the feed fence. In a preferred embodiment of an unmanned vehicle, the pre-adjusted maximum torque difference and/or the pre-adjusted orientation are/is also adjustable during operation.

The unmanned autonomous vehicle 1 is provided with a (non-shown) energy supply which is chargeable via laterally disposed charging strips 13 that are capable of being brought into contact with a charging device. Other ways of charging the energy supply, such as inductive means, are mentioned inter alia in the above-mentioned patent documents.

Moreover, the vehicle shown is provided with an inductive sensor 20 which is capable of detecting an induction strip 21 fitted in the ground. The sensor 20 is coupled to the control unit 11 which, in response to a received signal, is capable of, for example, turning the vehicle, or the like. Alternatively, the strip 21 may also be fitted on the ground or comprise, for example, an optically recognizable strip. In the latter case, the sensor 20 is, of course, an optical sensor, provided with a radiation source, if desired.

The adjustment in height and/or position, for example by the height adjustment, could also be controlled automatically, for example by means of the control unit 11. Such a control may, for example, take place when the vehicle leaves the area where feed is located or is expected to be located. Upon leaving the area, it is favorable to lift the feed displacing device. Owing to the greater distance to the ground, it is possible for the vehicle to remain cleaner, or to negotiate more uneven ground, such as a grid or a threshold of a shed or barn floor. For this purpose, there may be provided an additional sensor having such a functionality, such as a camera with image recognition equipment. Alternatively, the sensor 20 may, for example, also be equipped in this manner, or the ultrasonic detector 6 may, for example, be designed accordingly, such as being rotatable towards the ground. It is also possible to indicate per area which adjustment is desired, by means of the sensor 20, for example in the form of an inductive sensor or an optical sensor, and with the aid of the detection strip 21.

The unmanned vehicle 1 may additionally be arranged to supply feed. For this purpose, the unmanned vehicle 1 may be provided with a storage container for containing feed, and a discharge device for discharging feed towards the ground. The storage container is preferably provided with a mixing means for mixing feed. In this case, it is advantageous if the control unit controls the operation of the discharge device on the basis of data from the distance determining device and/or the torque difference determining device and/or the speed of the vehicle and/or the weight decrease of the storage container. This makes it possible, inter alia, to supply a uniform amount of feed. When, for example, at a certain distance to the feed fence the torque difference comes below a particular value (for example in a search table stored in a memory of the control unit), the amount of feed has decreased below a particular value. On the basis of these data, it is possible for the discharge device to deposit a certain amount of feed on that place of the ground. Alternatively or additionally, the unmanned vehicle 1 may be provided with a signaling device (for example a transmitting aerial with a suitable controlling transmitter circuit) for supplying a signal (for example for drawing the attention of an owner and/or operator of the unmanned vehicle), the control unit controlling the operation of the signaling device on the basis of data from the distance determining device and/or the torque difference determining device. The control is also based on the insight that the magnitude of the torque difference depends on the amount of feed present on the ground through which the unmanned vehicle is moving, and the torque difference may thus be used in an advantageous manner, together with the determined distance and orientation, for a correct control of the unmanned vehicle.

The above-mentioned description is included in order to illustrate the operation of preferred embodiments of the invention, and not to limit the scope of the invention. On the basis of the above-mentioned explanation, it will be obvious for a person skilled in the art that there are many variations falling within the spirit and scope of the present invention.

What is claimed is:

1. An unmanned autonomous vehicle for substantially lateral displacement of feed lying on a ground, comprising:
    two wheels separately drivable by separate drive units;
    a torque difference adjusting device for adjusting the torque difference between the wheels;
    a control unit for controlling the vehicle and moving it in a direction of travel by controlling at least one of the separate drive units;
    a feed displacing device for substantially lateral displacement of the feed; and
    an adjusting device which is arranged to adjust the height and/or the position of a lowest point of the feed displacing device, and which comprises a vehicle tilting device which is arranged in such a manner that the lowest point will be located at least substantially off the center line of the vehicle.

2. The unmanned vehicle according to claim 1, further comprising an additional supporting point for supporting the vehicle.

3. The unmanned vehicle according to claim 2, wherein the adjusting device comprises a height adjuster which is arranged to adjust the height of at least one of the wheels or the additional supporting point.

4. The unmanned vehicle according to claim 1, wherein the adjusting device is arranged for an automatic height adjustment to adjust the feed displacing device to exert a substantially constant pressure on the ground.

5. The unmanned vehicle according to claim 1, wherein the unmanned vehicle is provided with an orientation determining device to determine the orientation of the center line of the vehicle relative to the wall portion.

6. The unmanned vehicle according to claim 5, wherein the control unit is programmed so that, during operation, the center line of the vehicle remains in an orientation determined by the orientation determining device relative to the wall portion, the orientation being at least substantially equal to a pre-adjusted orientation.

7. The unmanned vehicle according to claim 6, wherein the pre-adjusted orientation is adjustable during operation of the vehicle.

8. The unmanned vehicle according to claim 1, further comprising a touch protection device which extends around the outer side of the vehicle and which is arranged to supply to the control unit a signal which depends on an encountered force or pressure.

9. The unmanned vehicle according to claim 8, wherein the control unit is arranged to change the orientation when the signal exceeds a predetermined threshold.

10. The unmanned vehicle according to claim 1, further comprising a sensor which is arranged to supply a signal to the control unit upon recognizing a detecting device located on or in the ground.

11. The unmanned vehicle according to claim 10, wherein the sensor comprises an inductive or optical sensor, and wherein the detecting device comprises a conductive or magnetic or optical detecting device.

12. The unmanned vehicle according to claim 1, further comprising a sensor device which recognizes the kind or condition of the ground, and wherein the control device is arranged to adjust, by means of a signal from the sensor device, the height and/or the position of the feed displacing device.

13. The unmanned vehicle according to claim 1, further comprising a distance determining device for determining a distance from the vehicle to a wall portion, and wherein the control unit is adapted to maintain a distance determined by the distance determining device to the wall portion, which distance is greater than or equal to a pre-adjusted minimum distance to the wall portion.

14. The unmanned vehicle according to claim 13, wherein the pre-adjustable distance is adjustable during operation.

15. The unmanned vehicle according to claim 1, wherein the feed displacing device comprises a freely rotatable annular element whose outer circumference forms the outer circumference of the vehicle.

16. The unmanned vehicle according to claim 15, wherein the annular element is tilted in such a manner that the lowest point is located closest to the ground at least substantially in a direction of travel of the vehicle.

17. The unmanned vehicle according to claim 1, wherein the unmanned vehicle is provided with a storage container for containing feed, and with a discharge device for discharging feed towards the ground, and wherein the control unit controls the operation of the discharge device on the basis of data from the torque difference determining device and/or the speed of the vehicle and/or the weight decrease of the storage container.

18. An unmanned autonomous vehicle for displacement of feed, comprising:
    at least two wheels and at least two drive units for separately driving the wheels;
    a control unit for controlling at least one of the drive units to move the vehicle in a direction of travel;
    an adjustable feed displacing device for displacing the feed at least laterally to the direction of travel, the feed displacing device being tiltable to have a single lowest point; and
    an adjusting device adapted to tilt the vehicle to adjust the feed displacing device so that the lowest point of the feed displacing device is positioned at a point not on the center line of the vehicle.

19. The unmanned vehicle according to claim 18, further comprising an additional supporting point for supporting the vehicle, and wherein the adjusting device adjusts the height of at least one of the wheels or the additional supporting point.

20. The unmanned vehicle according to claim 18, wherein the adjusting device is arranged for automatic adjustment to adjust the feed displacing device to exert a substantially constant pressure on the ground.

* * * * *